(12) United States Patent
Madera et al.

(10) Patent No.: US 12,208,477 B2
(45) Date of Patent: Jan. 28, 2025

(54) MANUFACTURING MACHINE TO MANUFACTURE A PRODUCT

(71) Applicant: G.D SOCIETA' PER AZIONI, Bologna (IT)

(72) Inventors: Giovanni Madera, Bologna (IT); Luca Lanzarini, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 210 days.

(21) Appl. No.: 17/802,422

(22) PCT Filed: Feb. 26, 2021

(86) PCT No.: PCT/IB2021/051616
§ 371 (c)(1),
(2) Date: Aug. 25, 2022

(87) PCT Pub. No.: WO2021/171241
PCT Pub. Date: Sep. 2, 2021

(65) Prior Publication Data
US 2023/0091368 A1    Mar. 23, 2023

(30) Foreign Application Priority Data

Feb. 26, 2020   (IT) .................. 102020000003958

(51) Int. Cl.
*B23P 21/00* (2006.01)
*B65G 1/04* (2006.01)
(Continued)

(52) U.S. Cl.
CPC .......... *B23P 21/004* (2013.01); *B65G 1/0485* (2013.01); *B65G 1/06* (2013.01);
(Continued)

(58) Field of Classification Search
None
See application file for complete search history.

(56) References Cited

U.S. PATENT DOCUMENTS 10,017,285 B2 *   7/2018   Boudreau ............... B65B 35/36
11,427,363 B2 *   8/2022   Lutz ....................... B65B 9/045
(Continued)

FOREIGN PATENT DOCUMENTS

EP           2626305 A1    8/2013
WO    WO-2019/003127 A2   1/2019
(Continued)

OTHER PUBLICATIONS

International Search Report and Written Opinion for Corresponding International Application No. PCT/IB2021/051616, datad Aug. 12, 2021.

*Primary Examiner* — Kavel Singh
(74) *Attorney, Agent, or Firm* — MARSHALL, GERSTEIN & BORUN LLP

(57) ABSTRACT

A manufacturing machine includes a feeding system that has first and second processing conveyors arranged in series along the processing path, and a transfer unit interposed between there-between that cyclically transfers the products from the first processing conveyor to the second processing conveyor, picking up the products in a pick-up station arranged in the area of the first processing conveyor and releasing the products in a release station arranged in the area of the second processing conveyor. The transfer unit has a plurality of trays, each having a series of seats designed to house a product, a moving system, which cyclically moves the trays between the pick-up and release stations, a first transferring and second transfer devices arranged in the pick-up station and release stations, respectively to transfer (Continued)

the products from the first processing conveyor to a tray, and from a tray to the second processing conveyor, respectively.

18 Claims, 6 Drawing Sheets

(51) Int. Cl.
*B65G 1/06* (2006.01)
*B65G 47/04* (2006.01)
*B65G 47/34* (2006.01)
*B65G 47/52* (2006.01)
*B65G 47/91* (2006.01)

(52) U.S. Cl.
CPC ............. *B65G 47/04* (2013.01); *B65G 47/34* (2013.01); *B65G 47/52* (2013.01); *B65G 47/918* (2013.01); *B65G 2201/0258* (2013.01); *B65G 2811/0663* (2013.01)

(56) References Cited

U.S. PATENT DOCUMENTS

| | | |
|---|---|---|
| 2007/0125727 A1 | 6/2007 | Winkler |
| 2016/0039550 A1 | 2/2016 | Boudreau et al. |
| 2020/0107580 A1* | 4/2020 | Testoni .................. A24F 40/10 |
| 2021/0179303 A1 | 6/2021 | Dietersberger et al. |

FOREIGN PATENT DOCUMENTS

| WO | WO-2019/159072 A1 | 8/2019 |
|---|---|---|
| WO | WO-2020/035160 A1 | 2/2020 |

* cited by examiner

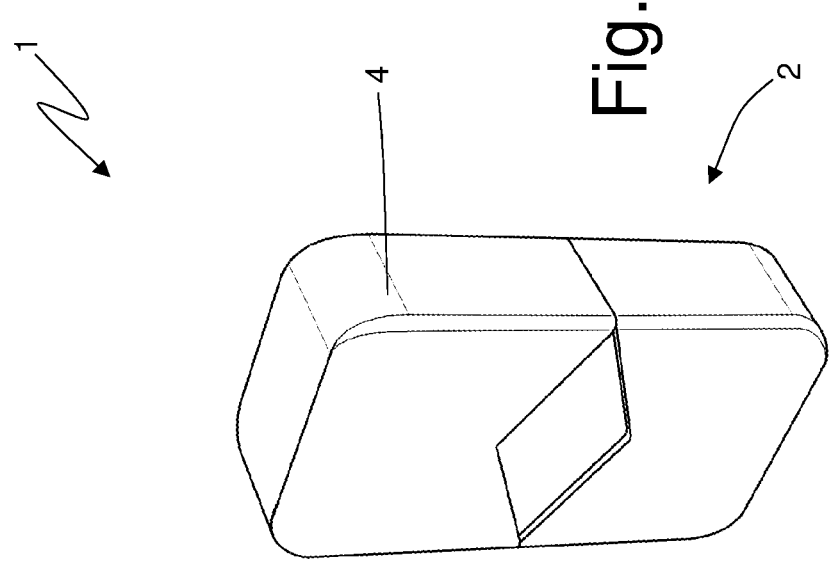
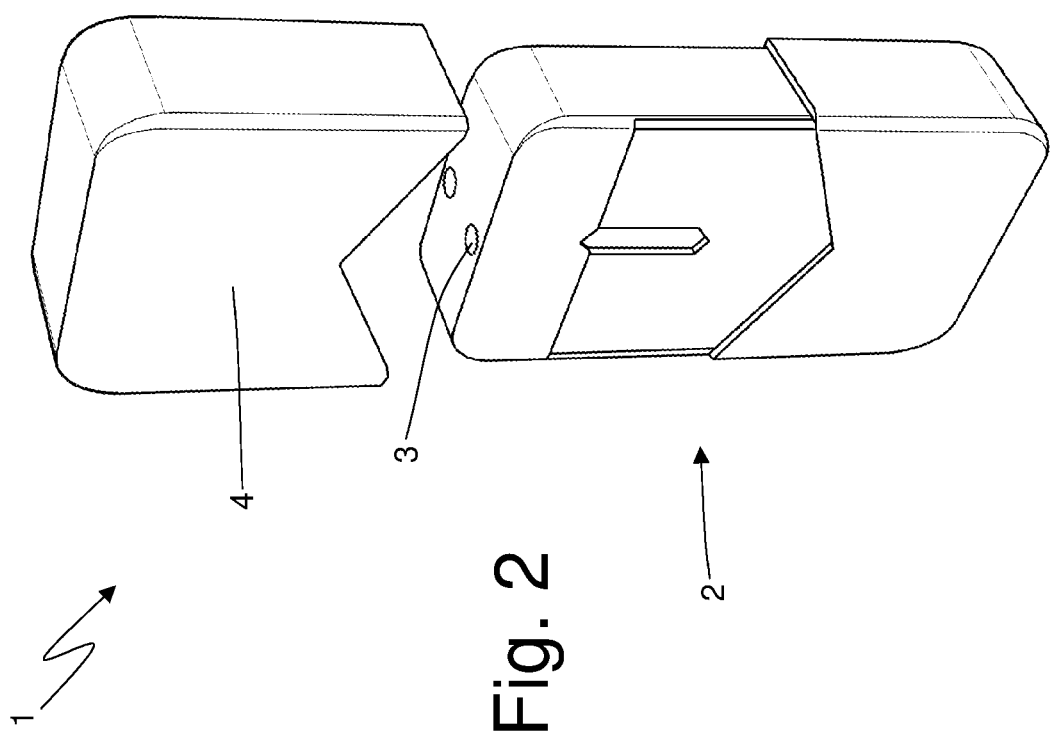

MANUFACTURING MACHINE TO MANUFACTURE A PRODUCT

CROSS-REFERENCE TO RELATED APPLICATIONS

This patent application is a U.S. national phase of International Patent Application No. PCT/IB2021/051616 filed Feb. 26, 2021, which claims the benefit of priority from Italian Patent Application 102020000003958 filed on Feb. 26, 2020, the respective disclosures of which are each incorporated herein by reference in their entireties.

TECHNICAL FIELD

The present invention relates to a manufacturing machine to manufacture a product.

The present invention finds advantageous application for the manufacturing of a disposable cartridge for an electronic cigarette, to which the following disclosure will make explicit reference without thereby losing generality.

PRIOR ART

Normally, an electronic cigarette comprising a reusable part that is used several times and contains, among other things, an electric battery (which provides the energy necessary for the operation of the electronic cigarette) and an electronic processor that oversees the operation of the electronic cigarette. Furthermore, the electronic cigarette comprises a single use cartridge (i.e., disposable, which is therefore used only once and is then replaced) which is coupled to the reusable part.

Manufacturing machines have been proposed to manufacture a disposable cartridge for an electronic cigarette as described, for example, in patent application WO2019159072A1. Said manufacturing machines are often provided with an assembly conveyor provided with a linear electric motor (e.g., by using the so-called XTS technology—eXtended Transport System—by Beckhoff®. In particular, the assembly conveyor comprises: an annular guide (i.e. closed in a loop on itself), a plurality of slides (carriages), each of which is coupled to the guide so as to freely slide along the guide, and a linear electric motor that moves the slides; the linear electric motor (also described in patent application WO2019220272A1) comprises an annular stator (i.e. a fixed primary) which is arranged in a fixed position along the guide and a plurality of movable sliders (i.e. movable secondaries), each of which is electro-magnetically coupled to the stator so as to receive, from the stator, a driving force and rigidly connected to a corresponding slide.

When it is necessary to carry out several operations to manufacture the disposable cartridge, the assembly conveyor must be particularly wide in order to have the necessary space. However, when the linear electric motor is very wide it necessarily comprises a large number of slides and it becomes very difficult to control with due precision the instantaneous position of each slide operating at high hourly productivity; consequently, it has been proposed to use two (or even more) assembly conveyors, which are arranged in series one after the other and each have a limited extension (and therefore maintaining a very precise control of the instantaneous position of each slide even when operating with high hourly productivity). Obviously in this case it is necessary to provide a transfer unit which is interposed between the two assembly conveyors and cyclically transfers the disposable cartridges being manufactured from the assembly conveyor arranged upstream to the assembly conveyor arranged downstream.

If the two assembly conveyors are arranged coplanar with one another, the transfer unit must comprise a robotic arm that picks up the disposable cartridges being manufactured from the assembly conveyor arranged upstream and transfers them to the assembly conveyor arranged downstream; however, a robotic arm of this type having to make the disposable cartridges complete a relatively long path is inevitably slow and therefore significantly penalizes the hourly productivity of the manufacturing machine (expressed with the number of disposable cartridges that can be manufactured in the time unit).

If the two assembly conveyors are arranged parallel to one another and staggered in order to have an overlapping area, the transfer unit can comprise a linear transfer unit which, by cyclically traveling a very short straight stroke perpendicular to the two assembly conveyors, can quickly transfer the disposable cartridges being manufactured from the assembly conveyor, which is arranged upstream to the assembly conveyor arranged downstream; however, this solution considerably increases the width (i.e., the transverse overall dimensions) of the manufacturing machine at the assembly conveyors and consequently increases the overall dimensions and makes access to all parts of the machine difficult (not very ergonomic) by an operator during assembly, maintenance and cleaning operations.

The patent application WO2019003127 describes a system for assembling parts of electronic cigarettes and comprising: a first conveyor with an endless linear motor; a first assembly of transport units connected to the first conveyor to be movable independently of one another along the first conveyor and configured to receive and hold parts of electronic cigarette; a first group of work stations arranged along the first conveyor for the assembly and inspection of the parts of electronic cigarette; a second conveyor with an endless linear motor arranged downstream of the first conveyor; a second assembly of transport units connected to the second conveyor to be movable independently of one another along the second conveyor and configured to receive and hold parts of electronic cigarette; a second group of work stations arranged along the second conveyor for the assembly and inspection of the parts of electronic cigarette; and a filling station, arranged between the first conveyor and the second conveyor to receive the parts of electronic cigarette from the first conveyor, fill the respective cartridges, and finally feed the parts of electronic cigarette with the respective filled cartridges to the second conveyor.

DESCRIPTION OF THE INVENTION

The object of the present invention is to provide a manufacturing machine to manufacture a product which allows high productivity to be achieved and, at the same time, has a modest transverse bulk.

According to the present invention, a manufacturing machine is provided to manufacture a product, according to what is claimed in the attached claims.

The claims describe embodiments of the present invention forming an integral part of the present description.

BRIEF DESCRIPTION OF THE DRAWINGS

The present invention will now be described with reference to the attached drawings, which illustrate a non-limiting embodiment thereof, wherein:

FIG. 1 is a perspective view of a cartridge for an electronic cigarette;

FIG. 2 is a perspective view of the cartridge of FIG. 1 with the removal of a removable cap;

PREFERRED EMBODIMENTS OF THE INVENTION

Figure 3:
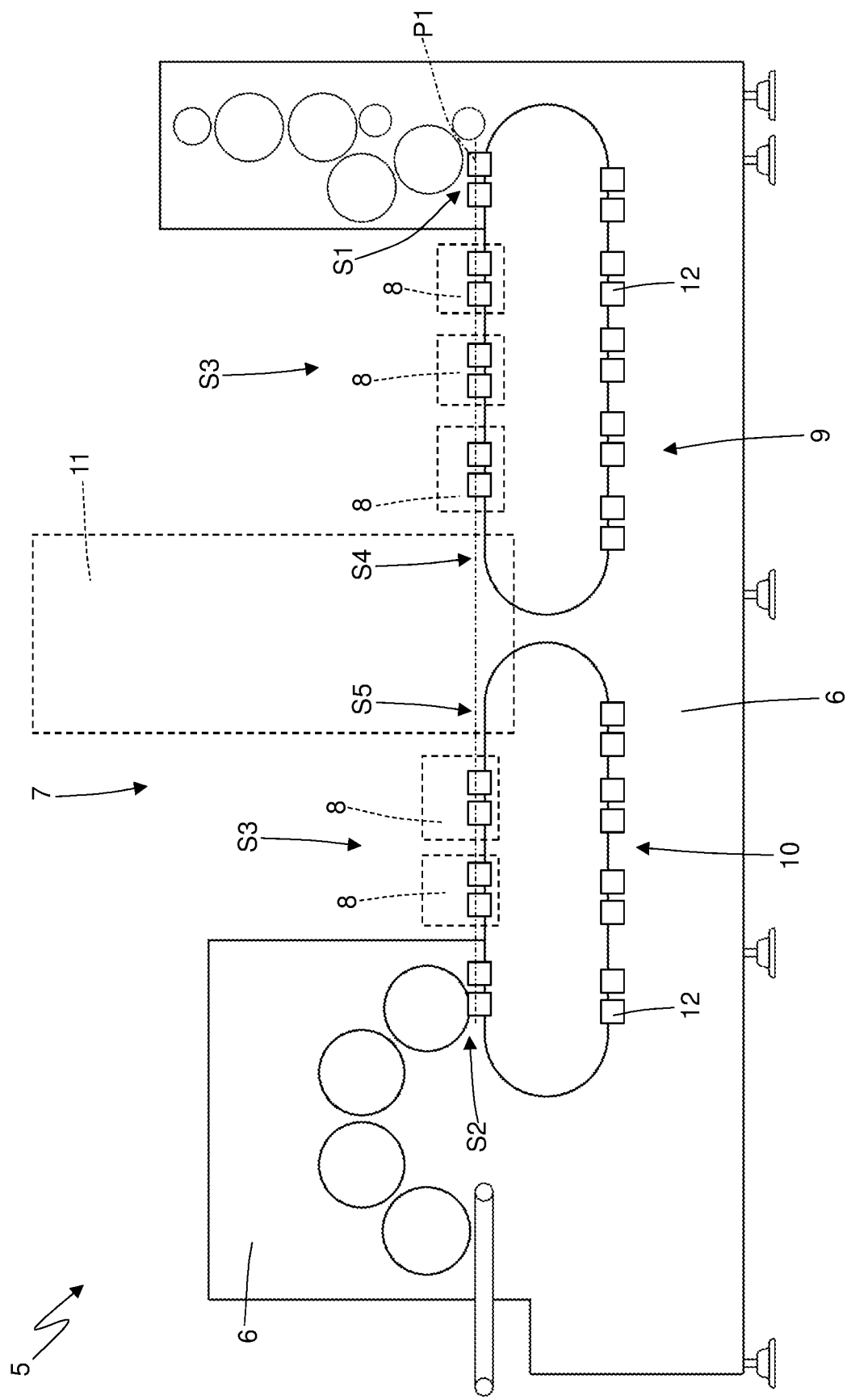
FIG. 3 is a front and schematic view of a manufacturing machine to manufacture the cartridge of FIG. 1 and made according to the present invention.

In FIGS. 1 and 2, number 1 denotes as a whole a single use cartridge (i.e., disposable which is therefore used only once and is then replaced) of a known type for an electronic cigarette.

The cartridge 1 comprises a main body 2 having a substantially parallelepiped shape which in use is coupled to an electronic cigarette from which it receives electrical power through two electrical contacts 3 arranged at a smaller base of the main body 2. Furthermore, the cartridge 1 comprises a cap 4 which is fitted onto the main body 2 to cover the area where the two electrical contacts 3 are arranged.

In FIG. 3, number 5 denotes as a whole a manufacturing machine to manufacture the cartridges 1 for electronic cigarettes described above.

According to what is illustrated in FIG. 3, the manufacturing machine 5 comprises a support body 6 (i.e., a frame) which rests on the ground by means of legs and has a vertical wall at the front on which the operating members are mounted. Furthermore, the manufacturing machine 5 comprises a feeding system 7, which feeds the cartridges 1 being processed along an assembly path P1 which develops between an inlet station S1 (where the feeding system 7 receives the cartridges 1) and an outlet station S2 (where the feeding system 7 releases the cartridges 1); in particular, the processing path P1 is horizontal and linear, i.e., it develops substantially along a straight line arranged horizontally. The processing path P1 passes through a series of processing stations S3, in which assembly operations are performed on the cartridges 1 in transit; in particular, each processing station S3 has a series of processing devices 8 which perform assembly operations (mounting of components, bending, welding, sealing, checking, discarding . . . ) on the cartridges 1 in transit.

The feeding system 7 comprises a processing conveyor 9 and a subsequent processing conveyor 10 which is arranged in series with the processing conveyor 9 along the processing path P1; in other words, along the processing path P1 the processing conveyor 9 is arranged upstream and receives the cartridges 1 in the inlet station S1 while the processing conveyor 10 is arranged downstream and releases the cartridges 1 in the outlet station S2. The feeding system 7 comprises a transfer unit 11 which is interposed between the two processing conveyors 9 and 10 and cyclically transfers the cartridges 1 from the processing conveyor 9 to the processing conveyor 10, picking up the cartridges 1 in a pick-up station S4 arranged at the processing conveyor 9 (i.e. arranged at one end of the processing conveyor 9) and releases the cartridges 1 to a release station S5 arranged at the processing conveyor 10 (i.e. arranged at a beginning of the processing conveyor 10).

In the embodiment illustrated in the attached figures, the feeding system 7 comprises two processing conveyors 9 and 10 between which a single transfer unit 11 is interposed; according to other embodiments not illustrated, the feeding system 7 comprises three, four or more processing conveyors 9 and 10 between which two, three or more transfer units 11 are interposed.

Figure 4:
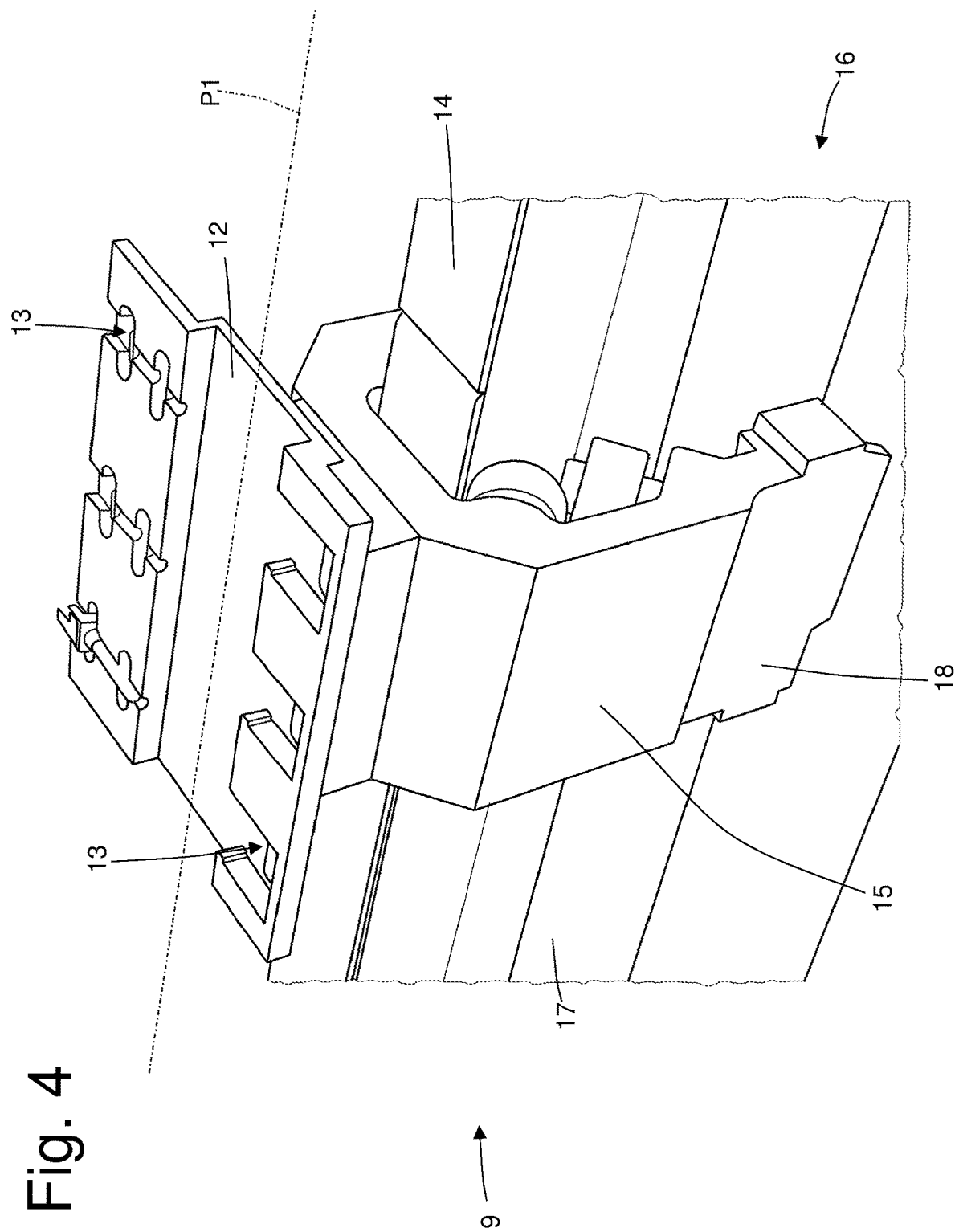
FIG. 4 is a perspective and schematic view of part of a processing conveyor of the manufacturing machine of FIG. 3.

As illustrated in FIG. 4, each processing conveyor 9 or 10 comprises a plate 12 on which seats 13 are formed, each of which is designed to house a cartridge 1 (more or less complete) or parts of the cartridge 1. The number of seats 13 of each plate 12 can vary according to the characteristics of the cartridge 1; moreover, the number and arrangement of the seats 13 in each plate 12 can be different between the processing conveyor 9 and the processing conveyor 10 (also the shape of the plate 12 can be different between the processing conveyor 9 and the processing conveyor 10). Consequently, the processing conveyor 9 can have seats 13 which have a first distance from one another, and the processing conveyor 10 can have seats 13 which have a second distance from one another different from the first distance (therefore the transfer unit 11 also has the function of modifying the distance and possibly also the orientation of the cartridges 1, or parts thereof, in the passage between the two processing conveyors 9 and 10).

Each processing conveyor 9 or 10 is normally designed to cyclically move each movable plate 12 along the processing path P1 with an intermittent movement (in a step like manner) which provides a cyclically alternating motion step, in which the processing conveyor 9 or 10 moves the movable plates 12, and stop steps, in which the processing conveyor 9 or 10 keeps the movable plates 12 still. Each processing conveyor 9 or 10 comprises an annular guide 14 (i.e., closed in a loop on itself) which is arranged in a fixed position along the processing path P1; in particular, the annular guide 14 is formed by a single fixed track (i.e., without movement) which is arranged along the processing path P1. Furthermore, each processing conveyor 9 or 10 comprises a plurality of slides 15, each of which supports a corresponding movable plate 12 and is coupled to the guide 14 so as to slide freely along the guide 14. Finally, each processing conveyor 9 or 10 comprises a linear electric motor 16 which moves the slides 15 carrying the movable plates 12 along the processing path P1; the linear electric motor 16 comprises an annular stator 17 (i.e. a fixed primary) which is arranged in a fixed position along the guide 14 and a plurality of movable sliders 18 (i.e. movable secondaries), each of which is electro-magnetically coupled to the stator 17 to receive a driving force from the stator 17 and is rigidly connected to a corresponding slide 15.

According to a different embodiment not illustrated, each processing conveyor 9 or 10 is a belt conveyor and comprises (at least) one flexible belt which supports the movable plates 12 and is closed in a loop around two end pulleys (at least one of which is motorized).

Figure 5:
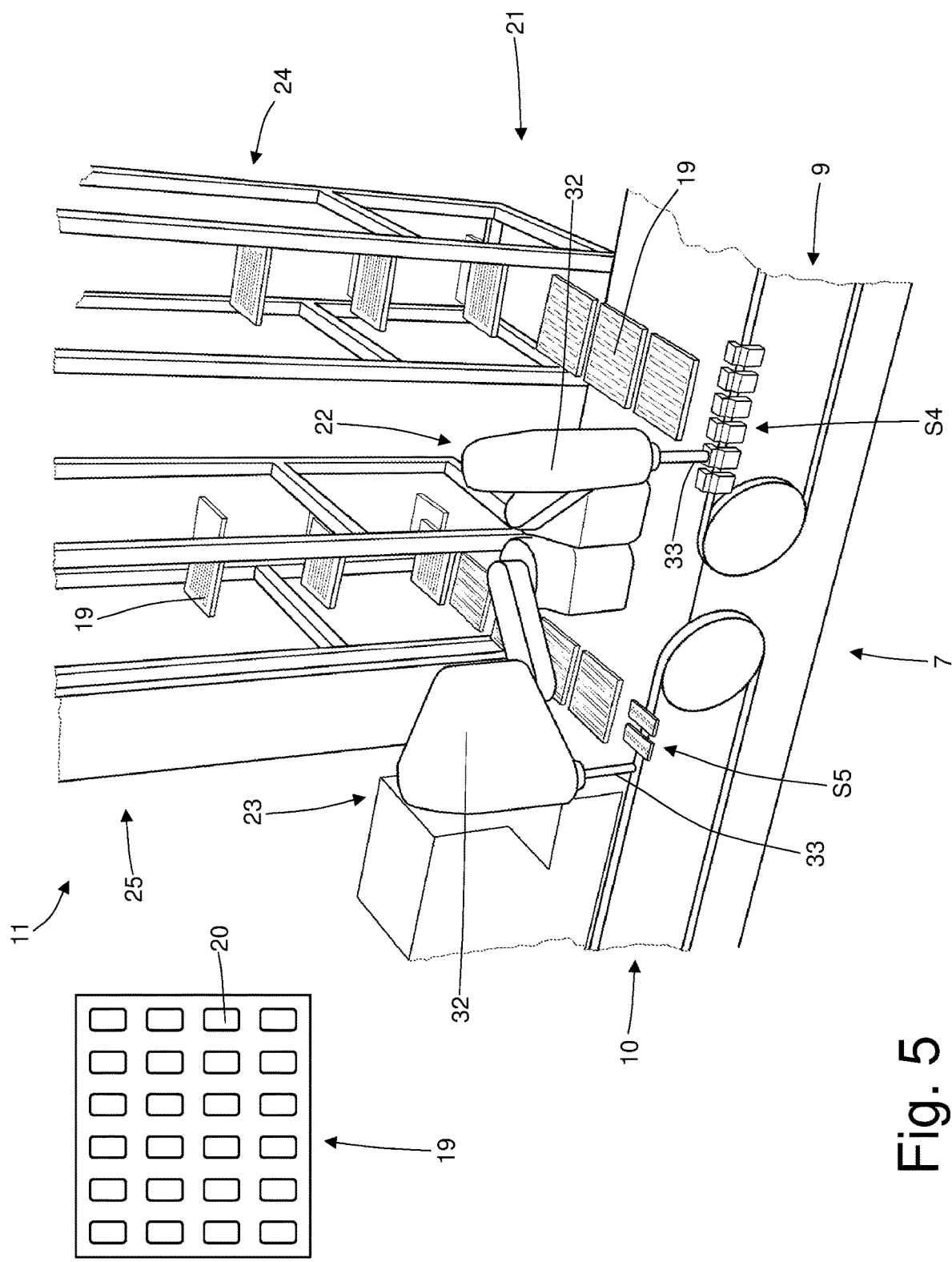
FIG. 5 is a perspective view of a transfer unit of the manufacturing machine of FIG. 3.

As illustrated in FIG. 5, the transfer unit 11 comprises a plurality of trays 19, each of which has a series of seats 20 each designed to house a cartridge 1 (more or less complete). Furthermore, the transfer unit 11 comprises a moving system 21 which cyclically moves the trays 19 (full, i.e., carrying respective cartridges 1) between the pick-up station S4 and the release station S5, a transferring device 22 which is arranged in the pick-up station S4 so as to transfer the cartridges 1 from the processing conveyor 9 to a tray 19, and a transferring device 23 which is arranged in the release station S5 to release the cartridges 1 from a tray 19 to the processing conveyor 10.

Figure 6:
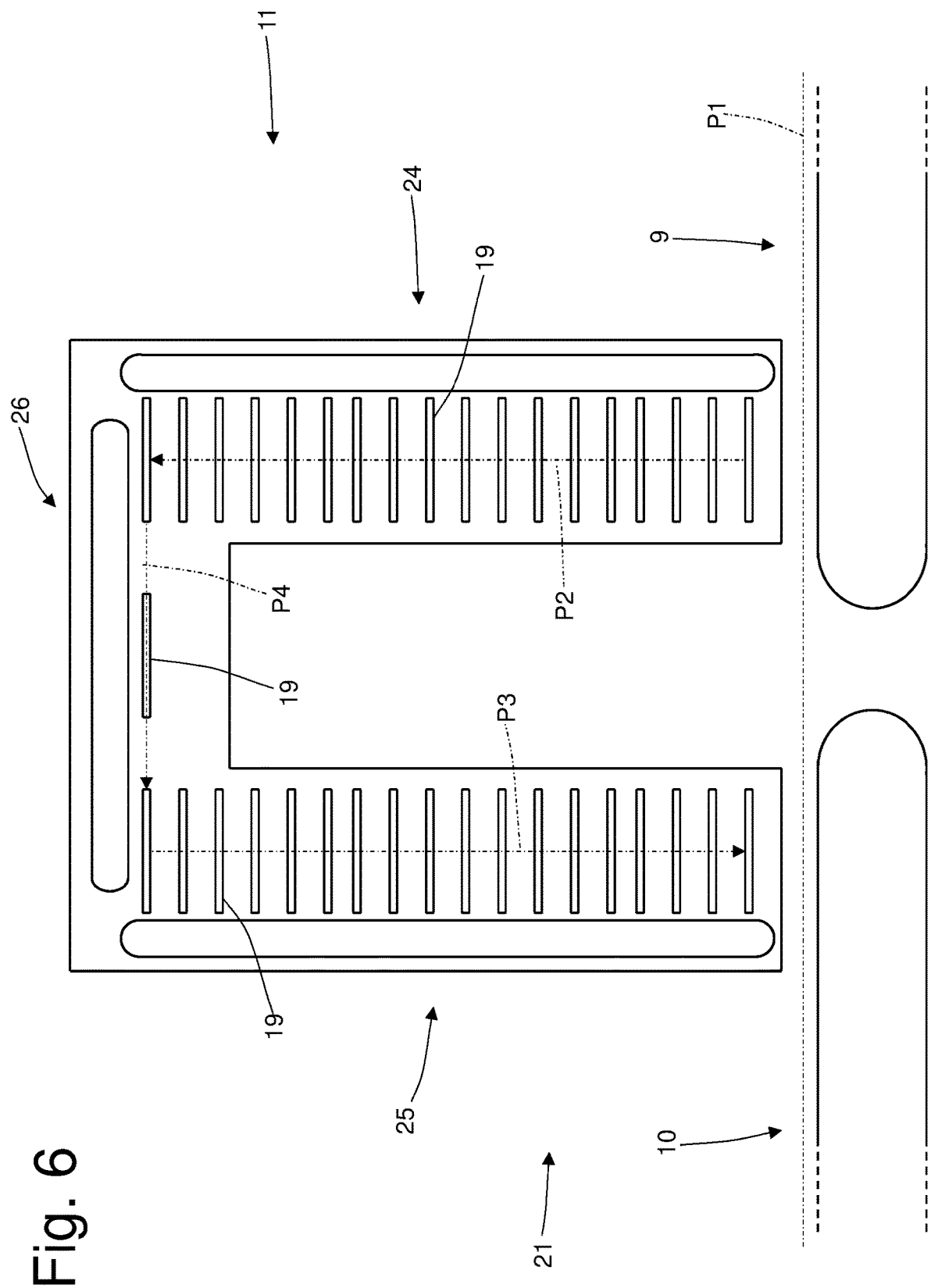
FIG. 6 is a schematic and front view of the transfer unit of FIG. 5.

As illustrated in FIGS. 5 and 6, the moving system 21 comprises a lifting device 24 which lifts the trays 19 upwards along a lifting path P2 perpendicular to the processing path P1, and a lowering device 25 which lowers the trays 19 downwards along a lowering path P3 perpendicular to the processing path P1 and parallel to the lifting path P2. The moving system 21 further comprises a joining device 26 which is arranged between a top of the lifting device 24 and a top of the lowering device 25 and transfers the trays 19 from the lifting device 24 to the lowering device 25 along a horizontal joining path P4; the joining path P4 is perpendicular to the paths P2 and P3 and joins the paths P2 and P3 together. In other words, the joining device 26 transfers the trays 19 from the lifting device 24 to the lowering device 25 along the horizontal joining path P4 which is perpendicular to the lifting path P2 and to the lowering path P3.

Figure 7:
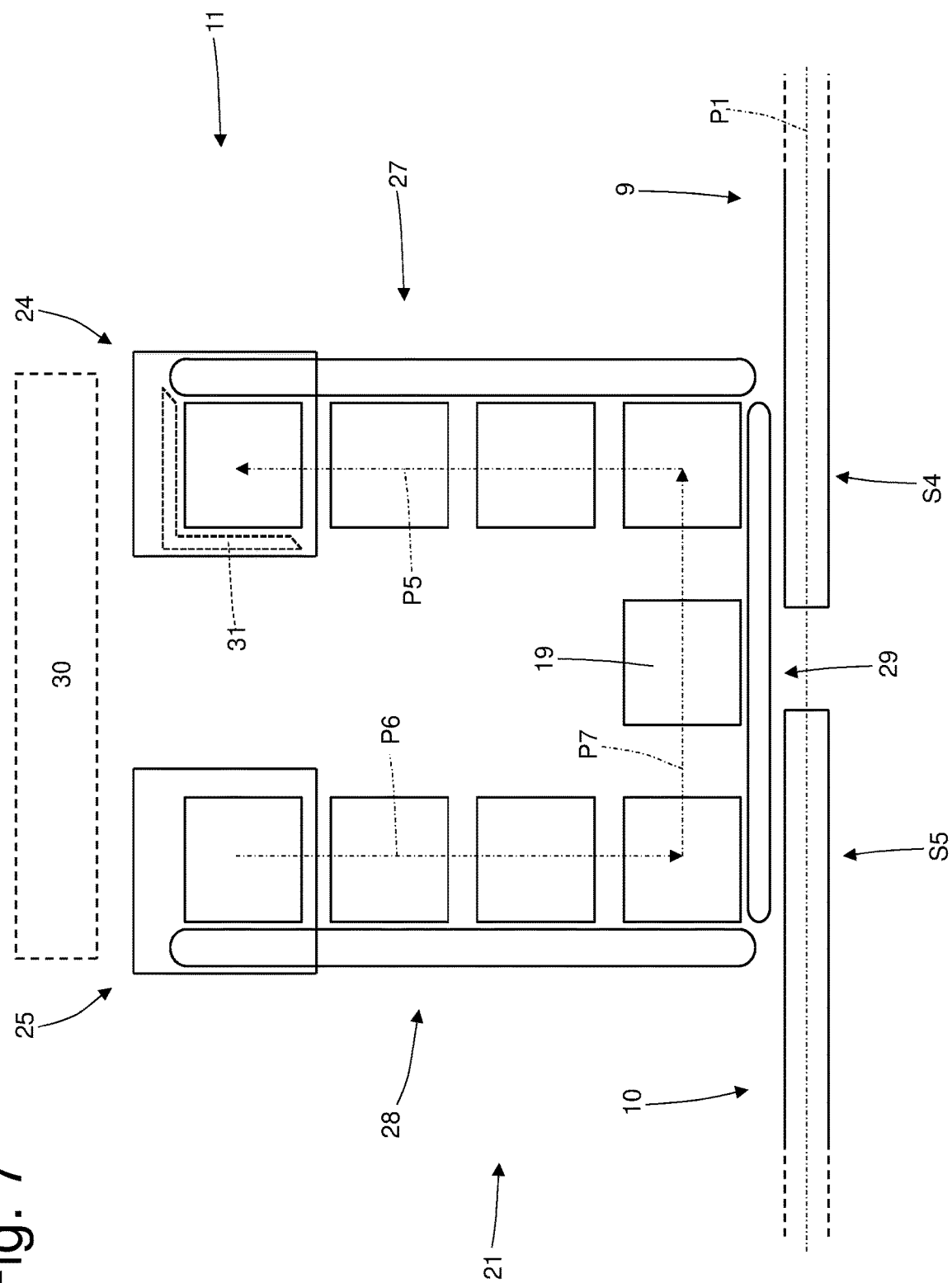
FIG. 7 is a schematic and plan view of the transfer unit of FIG. 5.

As illustrated in FIG. 7, the moving system 21 comprises a transport device 27 which transports the trays 19 from the pick-up station S4 to a base (inlet) of the lifting device 24 along a horizontal transport path P5 which is perpendicular to the processing path P1 and to the lifting path P2; in other words, the transport device 27 moves the full trays 19 (i.e., in which the seats 20 house respective cartridges 1) from the pick-up station S4, in which the trays 19 are filled by the transferring device 22, to the base of the lifting device 24, in which the trays 19 are taken over by the lifting device 24.

The moving system 21 comprises a transport device 28 which transports the trays 19 from a base of the lowering device 25 to the release station S5 along a horizontal transport path P6 which is parallel to the transport path P5 and is perpendicular to the processing path P1 and to the lowering path P3; in other words, the transport device 27 moves the full trays 19 (i.e., in which the seats 20 house respective cartridges 1) from the base (outlet) of the lowering device 25, from which the trays 19 are released by the lowering device 25, to the release station S5, in which the trays 19 are emptied by the transferring device 23.

The moving system 21 comprises a joining device 29 which is arranged between the transport device 27 and the transport device 28 and transfers the empty trays 19 (i.e., in which the seats 20 do not house respective cartridges 1) from the release station S5 to the pick-up station S4 along a horizontal joining path P7; the joining path P7 is perpendicular to the paths P5 and P6 and joins the paths P5 and P6 to one another. In other words, the joining device 29 transfers the empty trays 19 from the transport device 28 to the transport device 27 along the horizontal joining path P7 which is perpendicular to the transport path P5 and to the transport path P6.

According to a possible but non-limiting embodiment illustrated schematically in FIG. 7, the moving system 21 comprises a store 30 (e.g., of the FIFO type) which is designed to store empty and full trays 19 and is designed to exchange empty and full trays 19 with the moving system 21. When the processing conveyor 9 operates at a lower speed than the processing conveyor 10, the store inserts full trays 19 into the moving system 21 and picks-up empty trays 19 from the moving system 21 (to supply a surplus of cartridges 1 which compensate the lack of cartridges 1 due to the slowing down of the processing conveyor 9). When the processing conveyor 9 operates at a higher speed than the processing conveyor 10, the store inserts empty trays 19 into the moving system 21 and stores full trays 19 (to absorb a surplus of cartridges 1 due to the slowdown of the processing conveyor 10). When the processing conveyor 9 operates at the same speed as the processing conveyor 10, the store 30 is normally deactivated; in this condition, the store 30 could cyclically put back into circulation a full tray 9 previously stored to simultaneously pick up a new full tray 9 in order to avoid that the full trays 9 remain waiting for too long inside the store 30. The store 30 could exchanging the trays 19 with the lifting device 24, with the lowering device 25, with the joining device 26, with the transport device 27, with the transport device 28, or with the joining device 29.

According to a possible but non-limiting embodiment schematically illustrated in FIG. 7, the moving system 21 comprises an orientation device 31 which is designed to cause each tray 19 to rotate (normally by 90°, 180° or 270°) around a vertical rotation axis in order to impart to the cartridges 1 a variation of orientation during the transit in the moving system 21 (i.e., between the pick-up station S4 and the release station S5). In the illustrated embodiment, the orientation device 31 is coupled to the lifting device 24; alternatively, the orientation device 31 could be coupled to the lowering device 25, to the joining device 26, to the transport device 27, or to the transport device 28.

According to what is illustrated in FIG. 3, each transferring device 22 or 23 comprises a robotic arm 32 provided with a holding head 33 (normally of a suction type) designed to grab at least one cartridge 1; each holding head 33 could transfer a single cartridge 1 at a time or it could transfer multiple cartridges 1 at a time.

Furthermore, according to a particular embodiment, the transferring device 22 can modify the orientation of the cartridges 1 (e.g., by rotating them by 180°) during the transfer of said cartridges 1 from the processing conveyor 9 to the tray 19. Alternatively, the machine 5 could comprise a further transferring device, arranged downstream of the transferring device 22 which modifies the orientation of the cartridges 1 after the transferring device 22 has deposited them in the tray 19 and before said tray 19 is fed by the lifting device 24.

Similarly, the transferring device 23 can change the orientation of the cartridges 1 (e.g., by rotating them by 180°) during the transfer of said cartridges 1 from the tray 19 to the processing conveyor 10. Alternatively, the machine 5 could comprise a further transferring device, arranged upstream of the transferring device 23 which modifies the orientation of the cartridges 1 before they are picked up by the transferring device 23.

The embodiments described herein can be combined with each other without departing from the scope of the present invention.

The manufacturing machine 5 described above has numerous advantages.

In particular, the manufacturing machine 5 described above allows to reach high hourly production rates (i.e., number of pieces produced in the time unit) while guaranteeing an excellent quality standard of the cartridges 1 and offering optimal accessibility to all parts of the machine by of an operator during assembly, maintenance and cleaning operations.

This result is obtained thanks to the fact that the manufacturing machine 5 described above uses a feeding system 7 which is particularly extended (i.e., it has a particularly long processing path P1) to perform all the necessary processing operations, it is able to operate at high speed, and has a reduced thickness (transverse dimensions).

The invention claimed is:

1. A manufacturing machine (5) to manufacture a product (1);
   the manufacturing machine (5) comprises a feeding system (7) to feed the products (1) along a horizontal, straight processing path (P1);
   wherein the feeding system (7) comprises: a first processing conveyor (9), a second processing conveyor (10), which is arranged in series with the first processing conveyor (9) along the processing path (P1), and a transfer unit (11), which is interposed between the two processing conveyors (9, 10) and cyclically transfers the products (1) from the first processing conveyor (9) to the second processing conveyor (10), picking up the products (1) in a pick-up station (S4) arranged in the area of the first processing conveyor (9) and releasing the products (1) in a release station (S5) arranged in the area of the second processing conveyor (10);
   wherein the transfer unit (11) comprises:
   a plurality of trays (19), each having a series of seats (20), each designed to house a product (1);
   a moving system (21), which cyclically moves the trays (19) of said plurality of trays (19) between the pick-up station (S4) and the release station (S5);
   a first transferring device (22), which is arranged in the pick-up station (S4) so as to transfer the products (1) from the first processing conveyor (9) to a tray (19) of said plurality of trays (19); and
   a second transferring device (23), which is arranged in the release station (S5) so as to transfer the products (1) from a tray (19) of said plurality of trays (19) to the second processing conveyor (10);
   wherein the moving system (21) comprises: a lifting device (24), which lifts the trays (19) upwards along a lifting path (P2), which is perpendicular to the processing path (P1); a lowering device (25), which lowers the trays (19) downwards along a lowering path (P3), which is perpendicular to the processing path (P1) and parallel to the lifting path (P2); and a first joining device (26), which is arranged between a top of the lifting device (24) and a top of the lowering device (25) and transfers the trays (19) from the lifting device (24) to the lowering device (25); and
   wherein the first joining device (26) transfers the trays (19) from the lifting device (24) to the lowering device (25) along a first horizontal joining path (P4) which is perpendicular to the lifting path (P2) and to the lowering path (P3).

2. The manufacturing machine (5) according to claim 1, wherein the moving system (21) comprises:
   a first transport device (27), which transports the trays (19) from the pick-up station (S4) to a base of the lifting device (24) along a first horizontal transport path (P5), which is perpendicular to the processing path (P1) and to the lifting path (P2); and
   a second transport device (28), which transports the trays (19) from a base of the lowering device (25) to the release station (S5) along a second horizontal transport path (P6), which is parallel to the first transport path (P5) and is perpendicular to the processing path (P1) and to the lowering path (P3).

3. The manufacturing machine (5) according to claim 2, wherein the moving system (21) comprises a second joining device (29) which is arranged between the first transport device (27) and the second transport device (28) and transfers the trays (19) from the release station (S5) to the pick-up station (S4).

4. The manufacturing machine (5) according to claim 3, wherein the second joining device (29) transfers the trays (19) from the second transport device (28) to the first transport device (27) along a second horizontal joining path (P7) which is perpendicular to the first transport path (P5) and to the second transport path (P6).

5. The manufacturing machine (5) according to claim 1, wherein the moving system (21) comprises a store (30), which is designed to store empty and full trays (19) and is designed to exchange empty and full trays (19) with the moving system (21).

6. The manufacturing machine (5) according to claim 1, wherein the moving system (21) comprises an orientation device (31), which is designed to cause each tray (19) to rotate around a vertical rotation axis.

7. The manufacturing machine (5) according to claim 1, wherein:
   the first processing conveyor (9) has first seats (13), which have a first distance from one another; and
   the second processing conveyor (10) has second seats (13) which have a second distance from one another, which is different from the first distance.

8. The manufacturing machine (5) according to claim 1, wherein each processing conveyor comprises:
   an annular guide;
   a plurality of slides, each coupled to the guide so as to freely slide along the guide and having at least one seat designed to house a product (1); and
   a linear electric motor, which moves the slides and is provided with an annular stator, which is arranged in a fixed position along the guide, and with a plurality of movable slides, each electro-magnetically coupled to the stator so as to receive, from the stator, a driving force and rigidly connected to a corresponding slide.

9. The manufacturing machine (5) according to claim 1, wherein each transferring device (22, 23) comprises a robotic arm (32), which is provided with a holding head (33) designed to grab at least one product (1).

10. A manufacturing machine (5) to manufacture a product (1); the manufacturing machine (5) comprises a feeding system (7) to feed the products (1) along a horizontal, straight processing path (P1);
    wherein the feeding system (7) comprises: a first processing conveyor (9), a second processing conveyor (10), which is arranged in series with the first processing conveyor (9) along the processing path (P1), and a transfer unit (11), which is interposed between the two processing conveyors (9, 10) and cyclically transfers the products (1) from the first processing conveyor (9) to the second processing conveyor (10), picking up the products (1) in a pick-up station (S4) arranged in the area of the first processing conveyor (9) and releasing the products (1) in a release station (S5) arranged in the area of the second processing conveyor (10);
    wherein the transfer unit (11) comprises: a plurality of trays (19), each having a series of seats (20), each designed to house a product (1); a moving system (21), which cyclically moves the trays (19) of said plurality of trays (19) between the pick-up station (S4) and the release station (S5); a first transferring device (22), which is arranged in the pick-up station (S4) so as to transfer the products (1) from the first processing conveyor (9) to a tray (19) of said plurality of trays (19); and a second transferring device (23), which is arranged in the release station (S5) so as to transfer the products (1) from a tray (19) of said plurality of trays (19) to the second processing conveyor (10);

the moving system (21) comprises: a lifting device (24), which lifts the trays (19) upwards along a lifting path (P2), which is perpendicular to the processing path (P1); a lowering device (25), which lowers the trays (19) downwards along a lowering path (P3), which is perpendicular to the processing path (P1) and parallel to the lifting path (P2); a first transport device (27), which transports the trays (19) from the pick-up station (S4) to a base of the lifting device (24) along a first horizontal transport path (P5), which is perpendicular to the processing path (P1) and to the lifting path (P2); and a second transport device (28), which transports the trays (19) from a base of the lowering device (25) to the release station (S5) along a second horizontal transport path (P6), which is parallel to the first transport path (P5) and is perpendicular to the processing path (P1) and to the lowering path (P3).

11. The manufacturing machine (5) according to claim 10, wherein the moving system (21) comprises a second joining device (29) which is arranged between the first transport device (27) and the second transport device (28) and transfers the trays (19) from the release station (S5) to the pick-up station (S4).

12. The manufacturing machine (5) according to claim 11, wherein the second joining device (29) transfers the trays (19) from the second transport device (28) to the first transport device (27) along a second horizontal joining path (P7) which is perpendicular to the first transport path (P5) and to the second transport path (P6).

13. The manufacturing machine (5) according to claim 10, wherein each processing conveyor comprises:
   an annular guide;
   a plurality of slides, each coupled to the guide so as to freely slide along the guide and having at least one seat designed to house a product (1); and
   a linear electric motor, which moves the slides and is provided with an annular stator, which is arranged in a fixed position along the guide, and with a plurality of movable slides, each electro-magnetically coupled to the stator so as to receive, from the stator, a driving force and rigidly connected to a corresponding slide.

14. A manufacturing machine (5) to manufacture a product (1); the manufacturing machine (5) comprises a feeding system (7) to feed the products (1) along a horizontal, straight processing path (P1);
   wherein the feeding system (7) comprises: a first processing conveyor (9), a second processing conveyor (10), which is arranged in series with the first processing conveyor (9) along the processing path (P1), and a transfer unit (11), which is interposed between the two processing conveyors (9, 10) and cyclically transfers the products (1) from the first processing conveyor (9) to the second processing conveyor (10), picking up the products (1) in a pick-up station (S4) arranged in the area of the first processing conveyor (9) and releasing the products (1) in a release station (S5) arranged in the area of the second processing conveyor (10);
   wherein the transfer unit (11) comprises: a plurality of trays (19), each having a series of seats (20), each designed to house a product (1); a moving system (21), which cyclically moves the trays (19) of said plurality of trays (19) between the pick-up station (S4) and the release station (S5); a first transferring device (22), which is arranged in the pick-up station (S4) so as to transfer the products (1) from the first processing conveyor (9) to a tray (19) of said plurality of trays (19); and a second transferring device (23), which is arranged in the release station (S5) so as to transfer the products (1) from a tray (19) of said plurality of trays (19) to the second processing conveyor (10);
   wherein each processing conveyor comprises: an annular guide; a plurality of slides, each coupled to the guide so as to freely slide along the guide and having at least one seat designed to house a product (1); and a linear electric motor, which moves the slides and is provided with an annular stator, which is arranged in a fixed position along the guide, and with a plurality of movable slides, each electro-magnetically coupled to the stator so as to receive, from the stator, a driving force and rigidly connected to a corresponding slide.

15. The manufacturing machine (5) according to claim 14, wherein the moving system (21) comprises a store (30), which is designed to store empty and full trays (19) and is designed to exchange empty and full trays (19) with the moving system (21).

16. The manufacturing machine (5) according to claim 14, wherein the moving system (21) comprises an orientation device (31), which is designed to cause each tray (19) to rotate around a vertical rotation axis.

17. The manufacturing machine (5) according to claim 14, wherein:
   the first processing conveyor (9) has first seats (13), which have a first distance from one another; and
   the second processing conveyor (10) has second seats (13) which have a second distance from one another, which is different from the first distance.

18. The manufacturing machine (5) according to claim 14, wherein each transferring device (22, 23) comprises a robotic arm (32), which is provided with a holding head (33) designed to grab at least one product (1).

* * * * *